US010976250B2

(12) United States Patent
Nakamura et al.

(10) Patent No.: US 10,976,250 B2
(45) Date of Patent: Apr. 13, 2021

(54) POSITION DETECTION METHOD AND POSITION DETECTION DEVICE FOR SENSOR CHIP IN OPTICAL SAMPLE DETECTION SYSTEM (71) Applicant: KONICA MINOLTA, INC., Tokyo (JP)

(72) Inventors: Yukito Nakamura, Hachioji (JP); Takatoshi Kaya, Inagi (JP); Kosuke Nagae, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 16/478,243

(22) PCT Filed: Jan. 16, 2018

(86) PCT No.: PCT/JP2018/001072
§ 371 (c)(1),
(2) Date: Jul. 16, 2019

(87) PCT Pub. No.: WO2018/135503
PCT Pub. Date: Jul. 26, 2018

(65) Prior Publication Data
US 2019/0360934 A1 Nov. 28, 2019

(30) Foreign Application Priority Data
Jan. 19, 2017 (JP) .............................. JP2017-007358

(51) Int. Cl.
G01N 21/552 (2014.01)
G01N 21/13 (2006.01)
(Continued)

(52) U.S. Cl.
CPC ............ *G01N 21/554* (2013.01); *G01N 21/13* (2013.01); *G01N 21/648* (2013.01); *G01N 2021/8455* (2013.01)

(58) Field of Classification Search
CPC ...... G01N 2021/135; G01N 2021/8455; G01N 21/13; G01N 21/553; G01N 21/554; G01N 21/648
See application file for complete search history.

(56) References Cited

U.S. PATENT DOCUMENTS 6,130,745 A * 10/2000 Manian ............... G01N 21/6452
356/123
9,778,184 B2 * 10/2017 Tamura ................ G01N 21/648
(Continued)

FOREIGN PATENT DOCUMENTS

EP 3064929 A1 9/2016
JP 09005020 A 1/1997
(Continued)

OTHER PUBLICATIONS

International Search Report corresponding to Application No. PCT/JP2018/001072; dated Feb. 27, 2018.
(Continued)

*Primary Examiner* — Deoram Persaud
(74) *Attorney, Agent, or Firm* — Cantor Colburn LLP (57) ABSTRACT Provided is a position detection method and a position detection device for detecting a position of a sensor chip and obtaining relative positional information between a well member and a prism as for a well chip type sensor chip in which the well member is provided on a prism. By applying measurement light to the sensor chip while changing a distance between the sensor chip and a measurement light irradiation unit and detecting reflected light traveling in a predetermined direction out of the reflected light generated when the measurement light is reflected by the sensor chip, (Continued)

at least any one of the position of the sensor chip and the relative position between a dielectric member and a sample solution holding member is detected on the basis of a change in intensity of the detected reflected light.

24 Claims, 6 Drawing Sheets

(51) Int. Cl.
  *G01N 21/64* (2006.01)
  *G01N 21/84* (2006.01)

(56) References Cited

U.S. PATENT DOCUMENTS

2013/0078146 A1* 3/2013 Sando ............... G01N 21/553
                                                  422/69
2016/0245746 A1 8/2016 Noda et al.
2020/0319104 A1* 10/2020 Nakamura ......... G01N 21/6402

FOREIGN PATENT DOCUMENTS

| JP | 2002541430 A | 12/2002 |
| JP | 2004271337 A | 9/2004 |
| JP | 2006030155 A | 2/2006 |
| WO | 2015064704 A1 | 5/2015 |

OTHER PUBLICATIONS

Written Opinion of the International Searching Authority corresponding to Application No. PCT/JP2018/001072; dated Feb. 27, 2018.

Extended European Search Report corresponding to Application No. 18741632.6-1020/3572797; dated Nov. 29, 2019.

* cited by examiner

POSITION DETECTION METHOD AND POSITION DETECTION DEVICE FOR SENSOR CHIP IN OPTICAL SAMPLE DETECTION SYSTEM

CROSS REFERENCE TO RELATED APPLICATIONS

This is the U.S. national stage of application No. PCT/JP2018/001072, filed on Jan. 16, 2018. Priority under 35 U.S.C. § 119(a) and 35 U.S.C. § 365(b) is claimed from Japanese Application No. 2017-007358, filed Jan. 19, 2017; the disclosures of which are incorporated herein by reference.

TECHNICAL FIELD

The present invention relates to a position detection method and a position detection device for detecting a position of a sensor chip in an optical sample detection system which detects a substance to be measured included in the sensor chip by using a surface plasmon resonance device to which a surface plasmon resonance (SPR) phenomenon is applied, a surface plasmon-field enhanced fluorescence measurement device based on a principle of surface plasmon-field enhanced fluorescence spectroscopy (SPFS) and the like.

BACKGROUND ART

Conventionally, in a case of detecting a very minute substance, various sample detection devices capable of detecting such substance by applying a physical phenomenon of the substance are used.

As one of such sample detection devices, there is a surface plasmon resonance device (hereinafter, referred to as an "SPR device") to which a phenomenon of obtaining a high optical output by resonance of electrons and light in a minute area such as nanometer level (surface plasmon resonance (SPR) phenomenon) to detect a very minute analyte in a living body, for example.

Also, a surface plasmon-field enhanced fluorescence spectrometry device (hereinafter, referred to as an "SPFS device") capable of performing analyte detection more accurately than that by the SPR device on the basis of a principle of surface plasmon-field enhanced fluorescence spectroscopy (SPFS) to which the surface plasmon resonance (SPR) phenomenon is applied is one of such sample detection devices.

In the surface plasmon-field enhanced fluorescence spectroscopy (SPFS), surface plasmon light (compression wave) is generated on a surface of a metal film under a condition that excitation light such as laser light applied from a light source is subjected to attenuated total reflectance (ATR) on the surface of the metal film, so that a photon amount included in the excitation light applied from the light source is increased to several tens times to several hundreds times to obtain an electric field enhancing effect of the surface plasmon light.

In such SPFS device, in order to perform highly sensitive and highly accurate detection, it is necessary to align a position of the sensor chip with high accuracy. In order to correctly detect an amount of analyte, it is necessary to adjust an incident angle of the excitation light with high accuracy, but the incident angle of the excitation light cannot be adjusted with high accuracy when the position of the sensor chip is displaced.

Also, in order to detect the analyte with high sensitivity, it is preferable that a shape and a position of an irradiation spot of the excitation light coincide with a shape and a position of a reaction site on the metal film, but the shape and position of the irradiation spot of the excitation light cannot be adjusted with high accuracy when the position of the sensor chip is displaced.

In contrast, requiring a user to adjust the position of the sensor chip with high accuracy is not preferable from the viewpoint of usability.

Patent Literature 1 (WO 2015/064704) discloses a method of obtaining positional information of a sensor chip by irradiating the sensor chip with excitation light and detecting reflected light or transmitted light of the excitation light.

As disclosed in Patent Literature 1, on the basis of whether the reflected light or transmitted light of the excitation light is reflected or transmitted in a predetermined direction, or on the basis of a change in light amount of the reflected light or transmitted light, positions of a prism of the sensor chip and of a flow path lid may be detected.

CITATION LIST

Patent Literature

Patent Literature 1: WO 2015/064704

SUMMARY OF INVENTION

Technical Problem

However, in the position detection method disclosed in Patent Literature 1, the position detection is performed for the sensor chip referred to as a flow path chip type in which a flow path is formed on the prism.

Sensor chips include a well chip type in which a well member is provided on the prism. The well chip type sensor chip is used by a user by bonding the well member and the prism when a sample test is performed.

For this reason, a relative positional relationship between the well member and the prism might be displaced for each sample test. It is extremely important to grasp whether the well member is present within a predetermined range with respect to the prism in order to secure an optimal sample test and a quality of the sensor chip.

An object of the present invention is to provide a position detection method and a position detection device for detecting a position of a sensor chip and obtaining relative positional information between a well member and a prism as for a well chip type sensor chip in which the well member is provided on the prism.

Solution to Problem

The present invention is achieved to solve the above-described problem in the conventional art, and in order to realize at least one of the above-described objects, a position detection method of a sensor chip in an optical sample detection system reflecting one aspect of the present invention is a position detection method which detects, in an optical sample detection system which detects a sample by irradiating a sensor chip with excitation light, the sensor chip provided with:
a dielectric member;
a metal film adjacent to an upper surface of the dielectric member; and a sample solution holding member arranged on an upper surface of the metal film, at least any one of a position of the sensor chip and a relative position between the dielectric member and the sample solution holding member, the position detection method provided with steps of:

irradiating the sensor chip with measurement light while changing a distance between the sensor chip and a measurement light irradiation unit and detecting reflected light traveling in a predetermined direction out of the reflected light generated when the measurement light is reflected by the sensor chip; and detecting at least any one of the position of the sensor chip and the relative position between the dielectric member and the sample solution holding member on the basis of a change in intensity of the detected reflected light.

Also, a position detection device of a sensor chip in an optical sample detection system reflecting one aspect of the present invention is a position detection device which detects, in an optical sample detection system which detects a sample by irradiating a sensor chip with excitation light, the sensor chip provided with:

a dielectric member;

a metal film adjacent to an upper surface of the dielectric member; and a sample solution holding member arranged on an upper surface of the metal film, at least any one of a position of the sensor chip and a relative position between the dielectric member and the sample solution holding member, the position detection device provided with:

a measurement light irradiation unit which irradiates the sensor chip with measurement light;

a measurement light detection unit which detects reflected light traveling in a predetermined direction out of the reflected light generated when the measurement light is reflected by the sensor chip;

a conveyance unit which changes a distance between the sensor chip and excitation light irradiation unit; and a control unit which detects at least any one of the position of the sensor chip and the relative position between the dielectric member and the sample solution holding member on the basis of a change in intensity of the reflected light detected by the measurement light detection unit.

Advantageous Effects of Invention

According to the present invention, it is possible to grasp the displacement between the dielectric member (prism) and the sample solution holding member before performing the sample detection, to ensure the quality of the sensor chip, and to perform highly sensitive and highly accurate sample test.

Furthermore, the sensor chip may be aligned with high accuracy without bothering a user, and highly sensitive and highly accurate sample test may be performed while preventing deterioration in usability.

DESCRIPTION OF EMBODIMENTS

Hereinafter, embodiments (examples) of the present invention are described in further detail with reference to the drawings.

Figure 1:
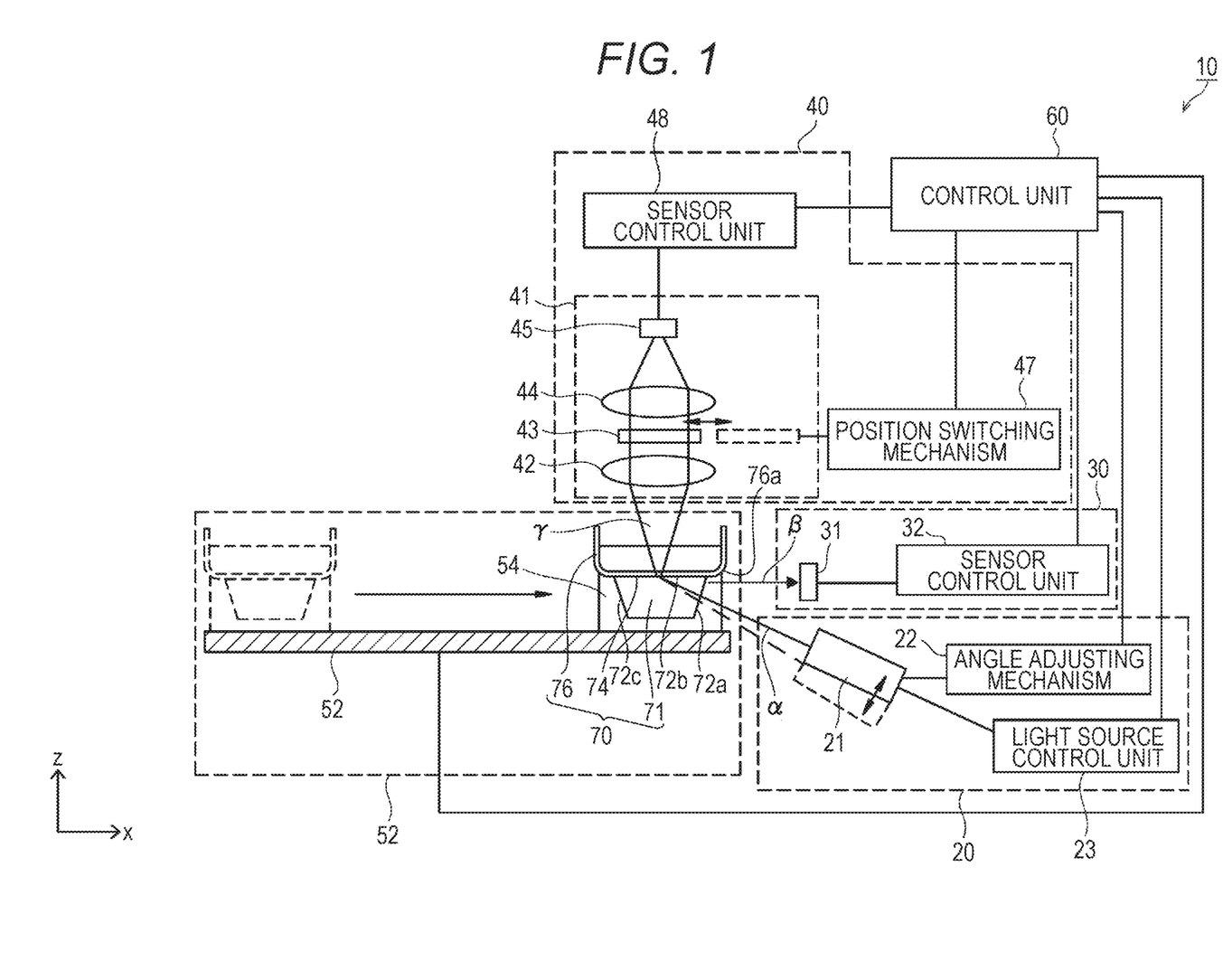
FIG. 1 is a schematic diagram for explaining a configuration of a surface plasmon-field enhanced fluorescence spectrometry device (SPFS device) including a position detection device according to one embodiment of the present invention.

FIG. 1 is a schematic diagram for explaining a configuration of a surface plasmon-field enhanced fluorescence spectrometry device (SPFS device) including a position detection device according to one embodiment of the present invention.

As illustrated in FIG. 1, an SPFS device 10 includes an excitation light irradiation unit 20, an excitation light detection unit 30, a fluorescence detection unit 40, a conveyance unit 50, and a control unit 60.

The SPFS device 10 is used in a state in which a sensor chip 70 is mounted on a chip holder 54 of the conveyance unit 50.

The sensor chip 70 includes a dielectric member 72 including an incident surface 72a, a film formation surface 72b, and an emission surface 72c, a metal film 74 formed on the film formation surface 72b, and a well member 76 being a sample solution holding member fixed on the film formation surface 72b or the metal film 74. In general, the sensor chip 70 is replaced for each sample test.

The sensor chip 70 is preferably a structure a length of each side of which is several millimeters to several centimeters, but this may also be a smaller structure or a larger structure not included in a category of a "chip".

The dielectric member 72 may be a prism made of a dielectric transparent to excitation light α. The incident surface 72a of the dielectric member 72 is a surface from which the excitation light α applied from the excitation light irradiation unit 20 enters the dielectric member 72. In addition, the metal film 74 is formed on the film formation surface 72b. The excitation light α entering the dielectric member 72 is reflected by an interface between the metal film 74 and the film formation surface 72b of the dielectric member 72 (hereinafter referred to as a "rear surface of the metal film 74" for convenience) and the excitation light α is emitted out of the dielectric member 72 through the emission surface 72c.

A shape of the dielectric member 72 is not especially limited, and the dielectric member 72 illustrated in FIG. 1 is a prism formed of a hexahedron having a substantially trapezoidal vertical cross-sectional shape (truncated square pyramid shape); however, this may also be a prism having a triangle (a so-called triangular prism), semicircular, or semi-elliptical vertical cross-sectional shape.

The incident surface 72a is formed so that the excitation light α does not return to the excitation light irradiation unit 20. When a light source of the excitation light α is a laser diode (hereinafter also referred to as "LD"), for example, when the excitation light α returns to the LD, an excited state of the LD is disturbed and a wavelength and an output of the excitation light α fluctuate.

Therefore, in a scanning range centered around an ideal enhancement angle, an angle of the incident surface 72a is set so that the excitation light α is not incident on the incident surface 72a perpendicularly. In this embodiment, an angle between the incident surface 72a and the film formation surface 72b and an angle between the emission surface 72c and the film formation surface 72b are both about 80 degrees.

Note that a design of the sensor chip 70 substantially determines a resonance angle (and the enhancement angle in the close vicinity thereof). Design elements are a refractive index of the dielectric member 72, a refractive index of the metal film 74, a thickness of the metal film 74, an extinction coefficient of the metal film 74, the wavelength of the excitation light α and the like. The resonance angle and the enhancement angle are shifted by an analyte immobilized on the metal film 74, but an amount thereof is smaller than several degrees.

The dielectric member 72 has a birefringence characteristic more than little. A material of the dielectric member 72 includes, for example, various inorganic substances such as glass and ceramic, natural polymers, synthetic polymers and the like, and from the viewpoint of chemical stability, production stability, and optical transparency, one including silicon dioxide ($SiO_2$) or titanium dioxide ($TiO_2$) is preferable.

Also, the material of the dielectric member 72 is not especially limited as described above as long as this is a material optically transparent to at least the excitation light α, but a resin material is preferably used, for example, for providing the sensor chip 70 that is inexpensive and excellent in handleability.

When the dielectric member 72 is formed of the resin material, for example, polyesters such as polyethylene terephthalate (PET) and polyethylene naphthalate, polyolefins such as polyethylene (PE) and polypropylene (PP), polycycloolefins such as cyclic olefin copolymer (COC) and cyclic olefin polymer (COP), vinyl resins such as polyvinyl chloride and polyvinylidene chloride, polystyrene, polyetheretherketone (PEEK), polysulfone (PSF), polyethersulfone (PES), polycarbonate (PC), polyamide, polyimide, acrylic resin, triacetyl cellulose (TAC) and the like may be used.

The metal film 74 is formed on the film formation surface 72b of the dielectric member 72. As a result, an interaction (surface plasmon resonance) occurs between photons of the excitation light α incident on the film formation surface 72b under a total reflection condition and free electrons in the metal film 74, so that it is possible to generate located field light on a surface of the metal film 74.

A material of the metal film 74 is not especially limited as long as this is metal capable of causing the surface plasmon resonance; for example, this may be at least one type of metal selected from a group including gold, silver, aluminum, copper, and platinum, and more preferably gold, and further, this may be an alloy of these metals. Such metal is preferable as the metal film 74 because this is stable against oxidation and electric field enhancement by surface plasmon light becomes large.

Also, a method of forming the metal film 74 is not especially limited, but, for example, there may be sputtering, a deposition method (resistance heating deposition method, electron beam deposition method and the like), electrolytic plating, electroless plating and the like. Preferably, the sputtering or deposition method is desirably used because adjustment of a metal film formation condition is easy.

The thickness of the metal film 74 is not especially limited, but this is preferably within a range of 5 to 500 nm, and more preferably within a range of 20 to 70 nm in a case of gold, silver, copper, and platinum, 10 to 50 nm in a case of aluminum, and 10 to 70 nm in a case of the alloy thereof from the viewpoint of an electric field enhancing effect.

When the thickness of the metal film 74 is within the above-described range, the surface plasmon light is easily generated, which is preferable. Also, as long as the metal film 74 has such thickness, size (length×width) and shape thereof are not especially limited.

Also, a material of the well member 76 is not especially limited, and this may be produced of various materials such as synthetic resin, metal, and ceramic, for example.

A method of manufacturing the well member 76 is not especially limited. For example, this may be produced by a resin molding method, punching and the like, which are very commonly performed.

Figure 2:
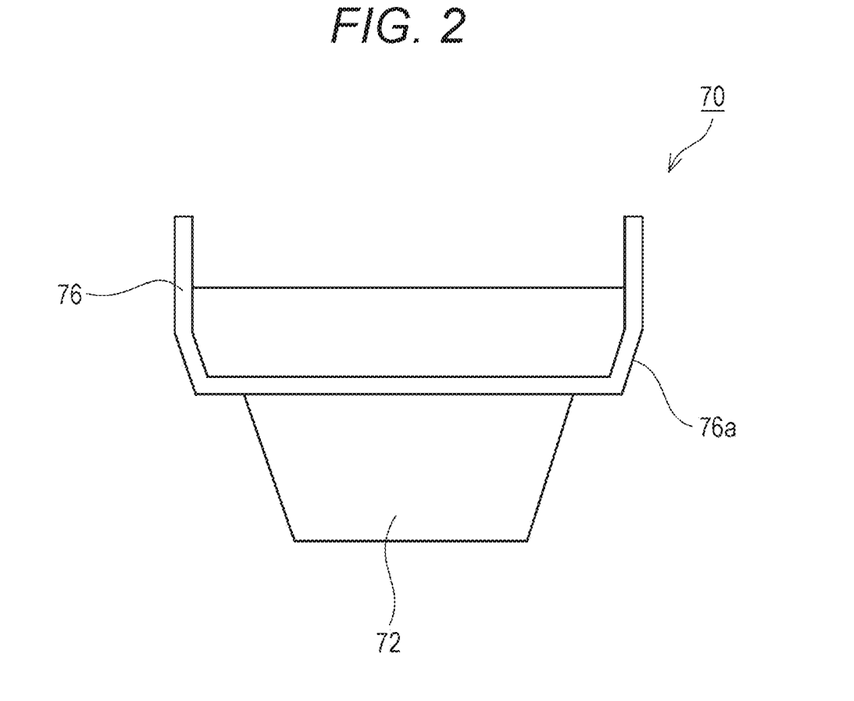
FIG. 2 is a schematic diagram for explaining a variation of a well member.

Note that, in this embodiment, a boundary surface 76a between a bottom surface and a side surface of the well member 76 is an R surface. A shape of the boundary surface 76a is not limited to this; as described later, it is sufficient that this includes an angled surface so that the excitation light α (reflected light β) reflected by the boundary surface 76a is incident on a light receiving sensor 31 of the excitation light detection unit 30, and it is also possible to form the boundary surface 76a at the substantially identical angle as that of the incident surface 72a of the dielectric member 72 as illustrated in FIG. 2, for example.

The well member 76 thus produced may be fixed to the dielectric member 72 by using an adhesive having a refractive index substantially the same as that of the dielectric member 72, matching oil, a transparent adhesive sheet and the like.

Although not illustrated in FIG. 1, a ligand for capturing the analyte is immobilized on a surface not facing the dielectric member 72 of the metal film 74 (hereinafter, referred to as a "surface of the metal film 74" for convenience). By immobilizing the ligand, it is possible to selectively detect the analyte.

In this embodiment, the ligand is uniformly immobilized on a predetermined area (reaction site) on the metal film 74. A type of the ligand is not especially limited as long as this may capture the analyte. In this embodiment, the ligand is an antibody specific to the analyte or a fragment thereof.

The sensor chip 70 thus configured is mounted on the chip holder 54 of the conveyance unit 50 of the SPFS device 10 as illustrated in FIG. 1, and the SPFS device 10 performs sample detection.

Next, each component of the SPFS device 10 is described. As described above, the SPFS device 10 includes the excitation light irradiation unit 20, the excitation light detection unit 30, the fluorescence detection unit 40, the conveyance unit 50, and the control unit 60.

The excitation light irradiation unit 20 irradiates the sensor chip 70 held by the chip holder 54 with the excitation light α. As described later, at the time of measurement of fluorescence γ, the excitation light irradiation unit 20 emits only a P wave to the metal film 74 to the incident surface 72a so that an incident angle to the metal film 74 becomes an angle that causes the surface plasmon resonance.

Herein, the "excitation light" is light which directly or indirectly excites a fluorescent substance. For example, the excitation light α is the light which allows the localized field light which excites the fluorescent substance to be generated on the surface of the metal film 74 when this is applied to the metal film 74 at the angle at which the surface plasmon resonance occurs via the dielectric member 72. In the SPFS device 10 in this embodiment, the excitation light α is used as measurement light for position detection and position adjustment of the sensor chip 70. Although the wavelength of the excitation light α as the measurement light is not especially limited, this is preferably set to the wavelength from visible light region to near infrared light region.

Note that, although not illustrated, it is also possible to provide a measurement light irradiation unit for applying the measurement light separately from the excitation light irradiation unit 20 to configure to apply the excitation light and the measurement light from different units.

The excitation light irradiation unit 20 includes a configuration for emitting the excitation light α toward the dielectric member 72 and a configuration for scanning the incident angle of the excitation light α with respect to the rear surface of the metal film 74. In this embodiment, the excitation light irradiation unit 20 includes a light source unit 21, an angle adjusting mechanism 22, and a light source control unit 23.

The light source unit 21 applies the excitation light α collimated and having constant wavelength and light amount to the rear surface of the metal film 74 so that a shape of an irradiation spot is substantially circular. The light source unit 21 includes, for example, the light source of the excitation light α, a beam shaping optical system, an automatic power-control (APC) mechanism, and a temperature adjusting mechanism (none of them is illustrated).

A type of the light source is not especially limited, and includes, for example, a laser diode (LD), a light emitting diode, a mercury lamp, and other laser light sources. When the light applied from the light source is not a beam, the light applied from the light source is converted into the beam by a lens, a mirror, a slit and the like. Also, when the light applied from the light source is not monochromatic light, the light applied from the light source is converted into the monochromatic light by a diffraction grating and the like. Furthermore, when the light applied from the light source is not linear polarized light, the light applied from the light source is converted into the linear polarized light by a light polarizer or the like.

The beam shaping optical system includes, for example, a collimator, a band pass filter, a linear polarization filter, a half wavelength plate, a slit, a zoom means and the like. The beam shaping optical system may include all of them or only a part of them.

The collimator collimates the excitation light α applied from the light source. The band pass filter makes the excitation light α applied from the light source narrow band light having only a central wavelength. This is because the excitation light α from the light source has a slight wavelength distribution width.

The linear polarization filter makes the excitation light α applied from the light source fully linear polarized light. The half wavelength plate adjusts a polarization direction of the excitation light α so that the P wave component is incident on the metal film 74. The slit and the zoom means adjust the beam diameter, a contour shape and the like of the excitation light α so that the shape of the irradiation spot on the rear surface of the metal film 74 becomes a circle of a predetermined size.

The APC mechanism controls the light source so that an output of the light source is constant. More specifically, the APC mechanism detects an amount of light branched from the excitation light α with a photodiode not illustrated or the like. Then, the APC mechanism controls input energy by a recurrent circuit, thereby controlling the output of the light source constant.

The temperature adjusting mechanism is, for example, a heater, a Peltier device and the like. The wavelength and energy of the emission light from the light source might fluctuate depending on temperature. Therefore, by keeping the temperature of the light source constant by the temperature adjusting mechanism, the wavelength and energy of the emission light from the light source are controlled constant.

The angle adjusting mechanism 22 adjusts the incident angle of the excitation light α to the metal film 74. In order to apply the excitation light α at a predetermined incident angle to a predetermined position of the metal film 74 via the dielectric member 72, the angle adjusting mechanism 22 relatively rotates an optical axis of the excitation light α and the chip holder 54.

For example, the angle adjusting mechanism 22 rotates the light source unit 21 around an axis orthogonal to the optical axis of the excitation light α (axis perpendicular to a paper surface of FIG. 1). At that time, a position of a rotation axis is set such that a position of the irradiation spot on the metal film 74 scarcely changes even when the incident angle is scanned. Displacement in irradiation position may be minimized by setting a position of the rotation center in the vicinity of an intersection of two optical axes of the excitation light α at both ends of a scanning range of the incident angle (between the irradiation position on the film formation surface 72b and the incident surface 72a).

Out of the incident angles of the excitation light α to the metal film 74, the angle at which the maximum light amount of the plasmon scattered light may be obtained is the enhancement angle. By setting the incident angle of the excitation light α to the enhancement angle or the angle in the vicinity thereof, it becomes possible to measure high-intensity fluorescence γ.

Note that a basic incidence condition of the excitation light α is determined by the material and shape of the dielectric member 72 of the sensor chip 70, the thickness of the metal film 74, the refractive index of sample solution in the well member 76 and the like; however, an optimal incidence condition slightly fluctuates due to a type and an amount of the analyte in the well member 76, an error in shape of the dielectric member 72 and the like. Therefore, it is preferable to obtain an optimal enhancement angle for each sample test. In this embodiment, a preferable emission angle of the excitation light α with respect to a normal to the metal film 74 (straight line in a z-axis direction in FIG. 1) is about 70 degrees.

The light source control unit 23 controls various devices included in the light source unit 21 to control the application of the excitation light α of the light source unit 21. The light source control unit 23 is formed of, for example, a well-known computer or microcomputer including an arithmetic device, a control device, a storage device, an input device, and an output device.

The excitation light detection unit 30 detects the reflected light β generated by the application of the excitation light α to the sensor chip 70 for positioning the sensor chip 70 when performing optical measurement (for example, detection of the enhancement angle, measurement of the optical blank value, detection of the fluorescence γ and the like). Preferably, the excitation light detection unit 30 detects the reflected light β for positioning the sensor chip 70 before performing first optical measurement. In many cases, since the first optical measurement is the detection of the enhancement angle, it is preferable to detect the reflected light β prior to the detection of the enhancement angle. When the detection of the enhancement angle is not performed, the reflected light β is detected before the measurement of the optical blank. When none of the detection of the enhancement angle and the measurement of the optical blank is performed, the reflected light β is detected before the detection of the fluorescence γ. In this embodiment, the excitation light detection unit 30 detects the reflected light β of the excitation light α. The excitation light detection unit 30 includes the light receiving sensor 31 and a sensor control unit 32.

The light receiving sensor 31 detects the reflected light β of the excitation light α. A type of the light receiving sensor 31 is not especially limited as long as this may detect the reflected light β of the excitation light α, and for example, a photodiode (PD) may be used.

A size of a light receiving surface of the light receiving sensor 31 is preferably larger than the beam diameter of the excitation light α. For example, when the beam diameter of the excitation light α is about 1 to 1.5 mm, a length of one side of the light receiving surface of the light receiving sensor 31 is preferably 3 mm or longer.

The light receiving sensor 31 is arranged in a position on which the reflected light β of the excitation light α is incident. In this embodiment, the light receiving sensor 31 is arranged in a position on which the reflected light β from the incident surface 72a of the dielectric member 72 and the reflected light β from the boundary surface 76a of the well member 76 are incident. Preferably, the light receiving sensor 31 is arranged in a position on which the reflected light β of the excitation light α emitted at the same angle as that when the fluorescence γ is detected or an angle close to the same is incident.

The irradiation position of the excitation light α slightly changes due to the change in incident angle, so that it becomes possible to make positioning accuracy when detecting the fluorescence γ higher by making the incident angle of the excitation light α the same angle or the close angle when positioning the sensor chip 70 and when measuring the fluorescence γ.

In this embodiment, when the emission angle of the excitation light α with respect to the normal to the metal film 74 (straight line in the z-axis direction in FIG. 1) is about 70 degrees, the reflected light β from the incident surface 72a travels substantially horizontally to a travel direction of the conveyance stage 52 (x-axis direction in FIG. 1). Therefore, the light receiving sensor 31 is arranged in a position on which the reflected light β traveling in the horizontal direction is incident.

The sensor control unit 32 controls detection of an output value of the light receiving sensor 31, management of sensitivity of the light receiving sensor 31 by the detected output value, change in sensitivity of the light receiving sensor 31 for obtaining an appropriate output value and the like. The sensor control unit 32 is formed of, for example, a well-known computer or microcomputer including an arithmetic device, a control device, a storage device, an input device, and an output device.

The fluorescence detection unit 40 detects the fluorescence γ generated from the fluorescent substance excited by the irradiation of the metal film 74 with the excitation light α. The fluorescence detection unit 40 also detects the plasmon scattered light generated by the irradiation of the metal film 74 with the excitation light α as necessary. The fluorescence detection unit 40 includes, for example, a light receiving unit 41, a position switching mechanism 47, and a sensor control unit 48.

The light receiving unit 41 is arranged in a normal direction (z-axis direction in FIG. 1) of the metal film 74 of the sensor chip 70. The light receiving unit 41 includes a first lens 42, an optical filter 43, a second lens 44, and a light receiving sensor 45.

The first lens 42 is, for example, a condenser lens, and condenses light generated from an upper side of the metal film 74. The second lens 44 is, for example, an image forming lens, and forms an image of the light condensed by the first lens 42 on a light receiving surface of the light receiving sensor 45. An optical path between both the lenses 42 and 44 is a substantially parallel optical path. The optical filter 43 is arranged between both the lenses 42 and 44.

The optical filter 43 removes an excitation light component (plasmon scattered light) in order to guide only the fluorescence component to the light receiving sensor 45 and detect the fluorescence γ at a high S/N. The optical filter 43 includes an excitation light reflecting filter, a short wavelength cutting filter, and a band pass filter, for example. The optical filter 43 is a filter including a multilayer film which reflects a predetermined light component, for example, but this may also be a color glass filter which absorbs a predetermined light component.

The light receiving sensor 45 detects the fluorescence γ. The light receiving sensor 45 is not especially limited as long as this has high sensitivity capable of detecting weak fluorescence γ from the fluorescent substance labeled with a minute amount of analyte; for example, a photoelectron multiplier tube (PMT) or an avalanche photodiode (APD) may be used.

The position switching mechanism 47 switches a position of the optical filter 43 between a position on the optical path and a position out of the optical path in the light receiving unit 41. Specifically, when the light receiving sensor 45 detects the fluorescence γ, the optical filter 43 is arranged on the optical path of the light receiving unit 41, and when the light receiving sensor 45 detects the plasmon scattered light, the optical filter 43 is arranged out of the optical path of the light receiving unit 41. The position switching mechanism 47 is formed of, for example, a rotary driving unit and a known mechanism (a turntable, a rack and pinion and the like) for moving the optical filter 43 in the horizontal direction by using rotary movement.

The sensor control unit 48 controls detection of an output value of the light receiving sensor 45, management of sensitivity of the light receiving sensor 45 by the detected output value, change in sensitivity of the light receiving sensor 45 for obtaining an appropriate output value and the like. The sensor control unit 48 is formed of, for example, a well-known computer or microcomputer including an arithmetic device, a control device, a storage device, an input device, and an output device.

The conveyance unit 50 conveys and fixes the sensor chip 70 mounted on the chip holder 54 by a user to a measurement position. Herein, the "measurement position" is a position in which the excitation light irradiation unit 20 irradiates the sensor chip 70 with the excitation light α and the fluorescence detection unit 40 detects the fluorescence γ generated along with this.

Note that the conveyance unit 50 is also used to change a distance between the sensor chip 70 and the light source unit 21 of the excitation light irradiation unit 20 in position detecting and position adjusting steps to be described later.

The conveyance unit 50 includes the conveyance stage 52 and the chip holder 54. The chip holder 54 is fixed to the conveyance stage 52 and detachably holds the sensor chip 70. A shape of the chip holder 54 is not especially limited as long as this may hold the sensor chip 70 and does not interfere with the optical paths of the excitation light α, the reflected light β, and the fluorescence γ. For example, the chip holder 54 is provided with an opening through which the excitation light α, the reflected light β, and the fluorescence γ pass.

The conveyance stage 52 is formed so as to be able to move the chip holder 54 in one direction (x-axis direction in FIG. 1) and the opposite direction. The conveyance stage 52 is driven by, for example, a stepping motor and the like.

The control unit 60 controls the angle adjusting mechanism 22, the light source control unit 23, the position switching mechanism 47, the sensor control unit 48, and the conveyance stage 52. The control unit 60 also serves as a position adjusting unit which specifies the position of the sensor chip 70 held by the chip holder 54 on the basis of a detection result of the excitation light detection unit 30 and moves the chip holder 54 by the conveyance stage 52 to move the sensor chip 70 to an appropriate measurement position. The control unit 60 is formed of, for example, a well-known computer or microcomputer including an arithmetic device, a control device, a storage device, an input device, and an output device.

Figure 3:
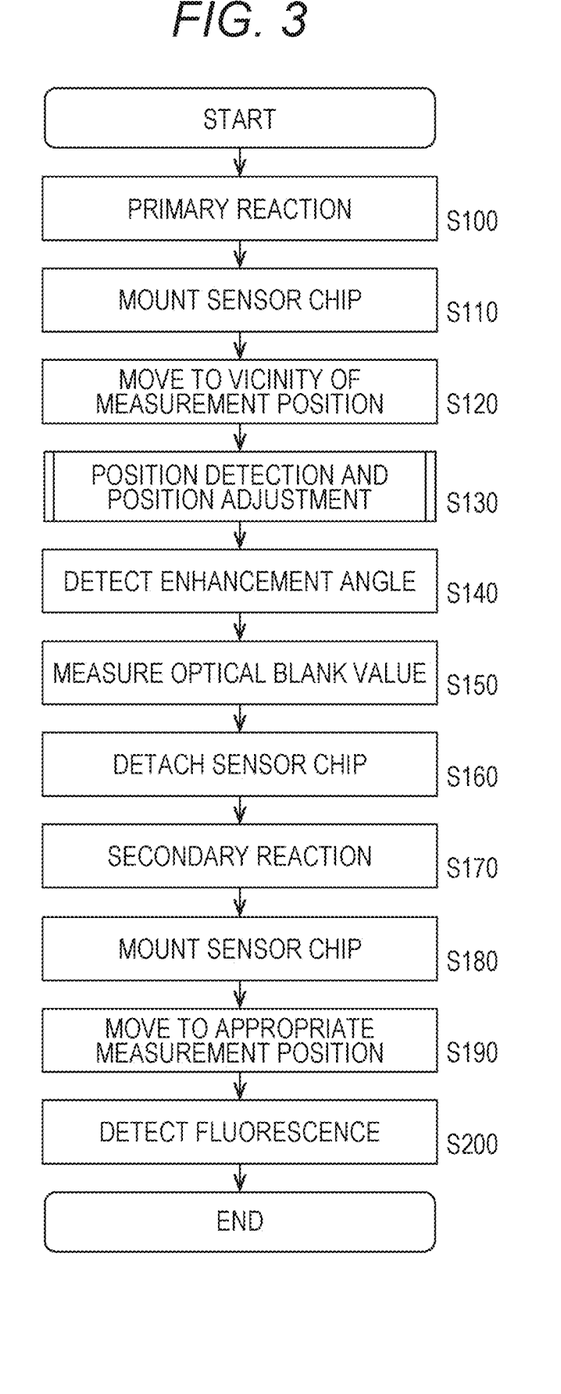
FIG. 3 is a flowchart illustrating an example of an operation procedure of the SPFS device illustrated in FIG. 1.
Figure 4:
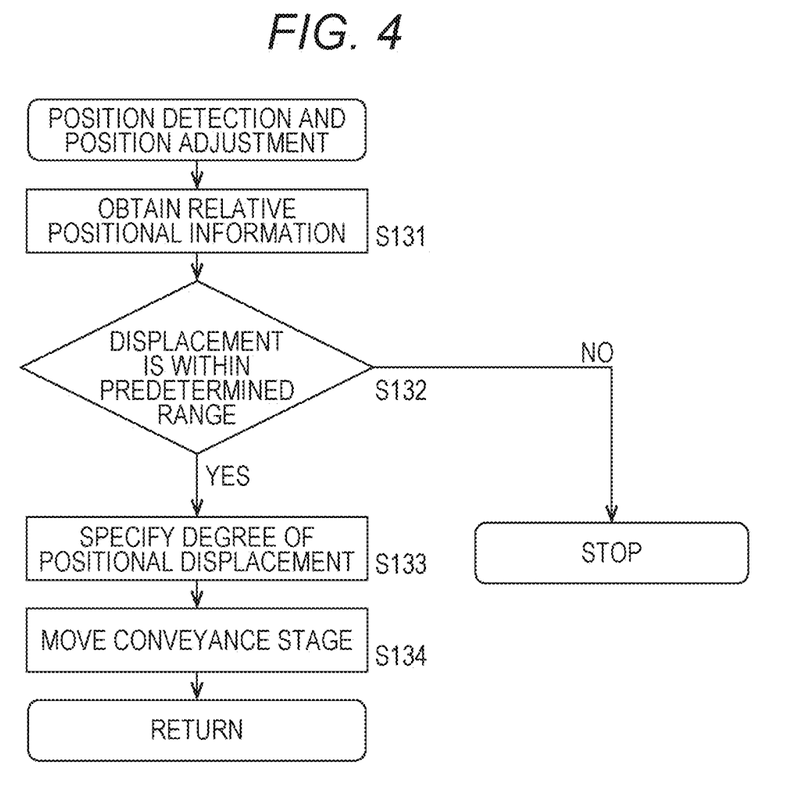
FIG. 4 is a flowchart illustrating steps in position detecting and position adjusting steps illustrated in FIG. 3.

Hereinafter, a flow of sample detection using the SPFS device 10 is described. FIG. 3 is a flowchart illustrating an example of an operation procedure of the SPFS device 10, and FIG. 4 is a flowchart illustrating steps in the position detecting and position adjusting steps illustrated in FIG. 3.

First, the user injects sample solution containing a ligand that specifically binds to an analyte to be detected into the well member 76, immobilizes the ligand on the metal film 74 (primary reaction), and then washes the well member 76 to remove a substance not captured by the ligand (S100).

Note that the sample solution herein used is solution prepared using a sample, and for example, there is one obtained by a process for binding the fluorescent substance to the analyte contained in the sample by mixing the sample and a reagent.

Examples of such sample include, for example, blood, serum, plasma, urine, nasal fluid, saliva, stool, body cavity fluid (such as spinal fluid, ascites fluid, pleural effusion) and the like.

Also, the analyte contained in the sample may be, for example, a nucleic acid (DNA, which may be single-stranded or double-stranded, RNA, polynucleotide, oligonucleotide, peptide nucleic acid (PNA) and the like, or nucleoside, nucleotide, and their modified molecules), protein (polypeptide, oligopeptide and the like), amino acid (including modified amino acid), carbohydrate (oligosaccharide, polysaccharides, sugar chain and the like), lipid, or modified molecules thereof, a complex thereof; specifically, they may be a carcinoembryonic antigen such as α-fetoprotein (AFP), a tumor marker, a signal transducer, a hormone and the like without particular limitation.

The sensor chip 70 thus prepared is mounted on the chip holder 54 of the conveyance unit 50 in a mounting/detaching position (S110). The sensor chip 70 mounted on the chip holder 54 is conveyed by the conveyance unit 50 to the vicinity of the measurement position (S120).

At that time, the control unit 60 operates the excitation light irradiation unit 20, the excitation light detection unit 30, and the conveyance stage 52 to obtain positional information of the sensor chip 70 and relative positional information between the well member 76 and the dielectric member 72, and adjusts the position of the sensor chip 70 on the basis of the obtained positional information (S130).

As illustrated in FIG. 4, the positional information of the sensor chip and the relative positional information between the well member 76 and the dielectric member 72 are obtained (S131), and on the basis of the relative positional information, it is determined whether displacement between the well member 76 and the dielectric member 72 is within a predetermined range (S132). When the displacement is larger than the predetermined range, the sample test is stopped because the sample test with high accuracy cannot be performed. At that time, it is desirable to notify the user of the fact that the sample test is stopped by, for example, sound, light, screen display and the like.

When the sample test is stopped, the user may recover the sample solution containing the analyte from the well member 76 of the sensor chip 70 and retest by using a new sensor chip 70, so that waste of the sample solution may be reduced.

On the other hand, when the displacement between the well member 76 and the dielectric member 72 is within the predetermined range, a degree of positional displacement of the sensor chip 70 from the measurement position is specified on the basis of the positional information of the sensor chip 70 (S133). Next, on the basis of the obtained positional information and degree of positional displacement, the chip holder 54 is moved by the conveyance stage 52, and the sensor chip 70 is arranged in the appropriate measurement position (S134).

FIG. 5A to FIG. 5D is a schematic diagram for explaining the step (S130) of obtaining the positional information of the sensor chip 70 and the relative positional information between the well member 76 and the dielectric member 72.

Figures 5A, 5B, 5C:
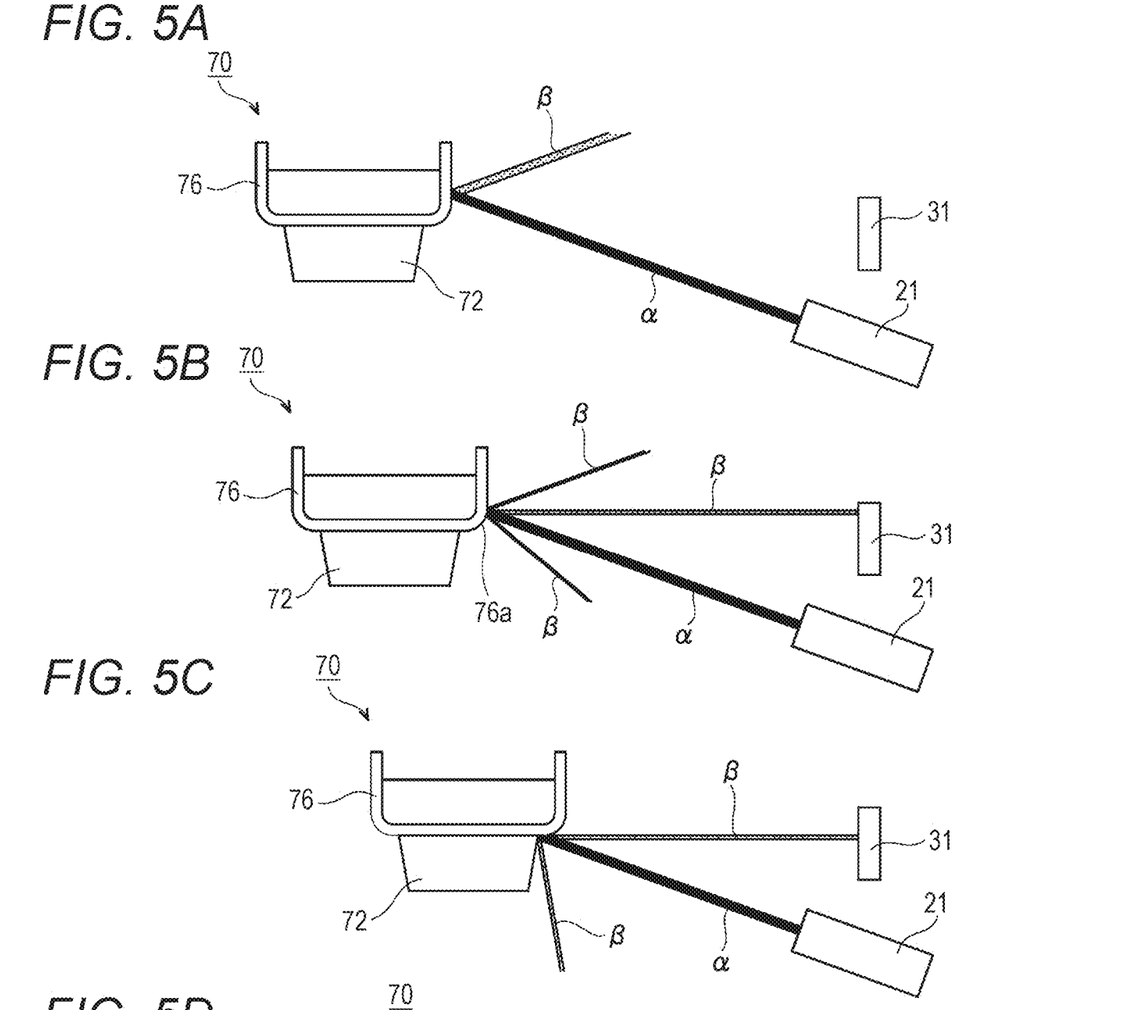
FIG. 5A-FIG. 5D is a schematic diagram for explaining a step (S140) of obtaining positional information of a sensor chip and relative positional information between the well member and a dielectric member.

First, as illustrated in FIG. 5A, when the sensor chip 70 is in a position away from the light source unit 21, when the light source unit 21 applies the excitation light α, the excitation light α is reflected by the side surface of the well member 76 to be directed upward. Therefore, the reflected light β from the sensor chip 70 is not incident on the light receiving sensor 31 of the excitation light detection unit 30.

When the sensor chip 70 is brought closer to the light source unit 21 in this state, the excitation light α from the light source unit 21 reaches the boundary surface 76a between the bottom surface and the side surface of the well member 76. In this case, as illustrated in FIG. 5B, the excitation light α (reflected light β) reflected by the boundary surface 76a is incident on the light receiving sensor 31. In this embodiment, since the boundary surface 76a of the well member 76 forms the R surface, as the sensor chip 70 is brought closer to the light source unit 21, a light amount of the reflected light β incident on the light receiving sensor 31 gradually increases.

When the sensor chip 70 is brought further closer to the light source unit 21, the excitation light α from the light source unit 21 is reflected by the bottom surface of the well member 76, and the reflected light β is directed downward. For this reason, the light amount of the reflected light β incident on the light receiving sensor 31 gradually decreases, and when the excitation light α is applied only to the bottom surface of the well member 76, the reflected light β is not incident on the light receiving sensor 31.

When the sensor chip 70 is brought further closer to the light source unit 21, the excitation light α from the light source unit 21 reaches a boundary (hereinafter referred to as an "edge") between the well member 76 and the dielectric member 72. In this case, as illustrated in FIG. 5C, the excitation light α (reflected light β) reflected by the bottom surface of the well member 76 is not incident on the light receiving sensor 31, but the excitation light α (reflected light β) reflected by the incident surface 72a of the dielectric member 72 is incident on the light receiving sensor 31.

Therefore, a part of the reflected light β from the sensor chip 70 is incident on the light receiving sensor 31.

Figure 5D:
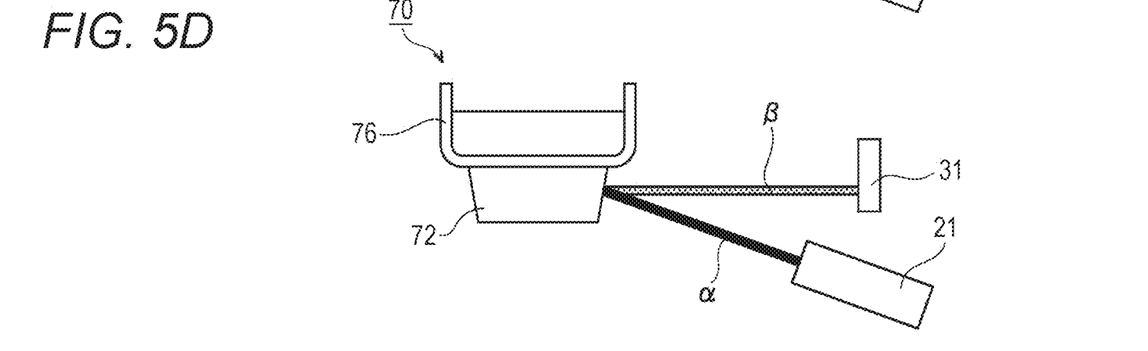

When the sensor chip 70 is brought further closer to the light source unit 21, the excitation light α from the light source unit 21 entirely reaches the incident surface 72a of the dielectric member 72. Therefore, as illustrated in FIG. 5D, the reflected light β from the sensor chip 70 is entirely incident on the light receiving sensor 31.

Figure 6:
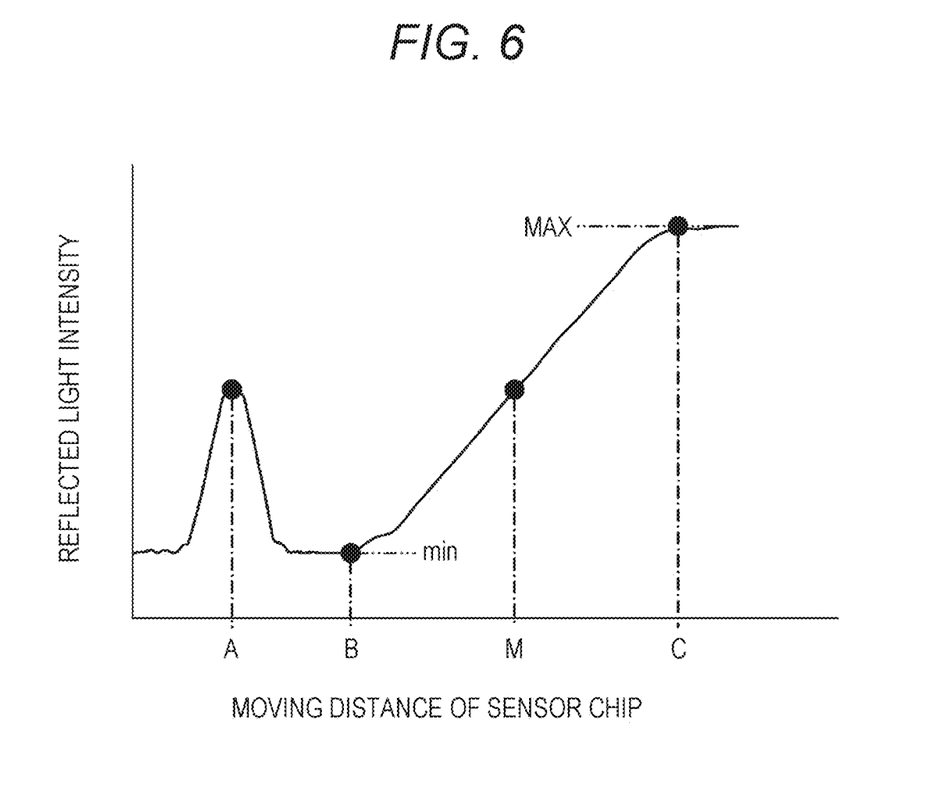
FIG. 6 is a graph illustrating an example of a detection result of reflected light β by a light receiving sensor.

FIG. 6 is a graph illustrating an example of the detection result of the reflected light β by the light receiving sensor 31. In this example, the light receiving sensor 31 measured the intensity of the reflected light β while moving the sensor chip 70 toward the light source unit 21 by the conveyance stage 52. The beam diameter of the excitation light α is about 1 to 1.5 mm.

As illustrated in FIG. 6, as the sensor chip 70 is brought closer to the light source unit 21, a local maximum point at which the light amount of the reflected light β temporarily increases appears. This means that, as illustrated in FIG. 5B, the reflected light β being the excitation light α from the light source unit 21 reflected by the boundary surface 76a between the bottom surface and the side surface of the well member 76 is incident on the light receiving sensor 31. Information on a position A of the local maximum point is made well member boundary surface positional information.

As the sensor chip 70 is brought further closer to the light source unit 21, the light amount of the reflected light β incident on the light receiving sensor 31 gradually increases from a position B. This is because, as illustrated in FIG. 5C, a part of the excitation light α is reflected by the incident surface 72a and incident on the light receiving sensor 31.

When the sensor chip 70 exceeds a position C, the light amount of the reflected light β incident on the light receiving sensor 31 becomes substantially constant. This is because, as illustrated in FIG. 5D, the excitation light α is entirely reflected by the incident surface 72a of the dielectric member 72 and the reflected light β is entirely incident on the light receiving sensor 31.

Therefore, an inclined portion between the position B and the position C illustrated in FIG. 6 coincides with timing at which the excitation light α passes through the edge. Note that a width of the inclined portion corresponds to the beam diameter (about 1 to 1.5 mm) in the x-axis direction of the excitation light α.

Herein, a position M which is a midpoint between the position B and the position C may be specified as the position of the edge, that is, the end of the dielectric member 72. Note that the position M may be simply the midpoint between the positions B and C. Also, in the graph illustrated in FIG. 6, by specifying the position M by obtaining a minimum value (corresponding to the light amount in the position B) of the light amount of the reflected light β and a maximum value of the light amount of the reflected light β (corresponding to the light amount in the position C), calculating an average value thereof, and detecting a position of the average value in the inclined portion, the position of the edge may be specified more accurately. Positional information of the position M is made edge positional information.

The control unit 60 may calculate relative positional information between the well member 76 and the dielectric member 72 from the well member boundary surface positional information and the edge positional information. Specifically, a distance between the boundary surface 76a of the well member 76 and the edge may be calculated by obtaining a difference between the position A of the boundary surface 76a of the well member 76 and the position M of the edge.

When the distance between the boundary surface 76a of the well member 76 and the edge is within a predetermined range, it is determined that the displacement between the well member 76 and the dielectric member 72 is within the predetermined range, and the sample test is continued. On the other hand, when the distance between the boundary surface 76a of the well member 76 and the edge is not within the predetermined range, it is determined that the displacement between the well member 76 and the dielectric member 72 is not within the predetermined range, and the sample test is stopped.

Also, the position of the sensor chip 70 may be specified by the edge positional information, and it is possible to detect whether the sensor chip 70 is correctly arranged in the measurement position.

When the sensor chip 70 is not arranged in the measurement position, the conveyance stage 52 is operated to move the sensor chip 70 to the measurement position. In general, a distance between the position of the edge and an area to be irradiated with the excitation light α on the rear surface of the metal film 74 (an area on a rear side of the reaction site) is fixed, so that it is possible to arrange the sensor chip 70 in the appropriate measurement position only by moving the chip holder 54 from the position of the edge by a predetermined distance by the conveyance stage 52.

Note that, even when the sensor chip 70 is arranged so as to be displaced in a height direction (z-axis direction) (for example, when a foreign material is interposed between the sensor chip 70 and the chip holder 54), it is possible to arrange the sensor chip 70 in the appropriate measurement position by moving the chip holder 54 in the x-axis direction from the position of the edge by a predetermined distance. Note that the control unit 60 stores the appropriate measurement position.

As described above, in a state in which the sensor chip 70 is arranged in the appropriate measurement position, the control unit 60 operates the excitation light irradiation unit 20 and the fluorescence detection unit 40 to irradiate the sensor chip 70 with the excitation light α, and detect the plasmon scattered light having the same wavelength as that of the excitation light α to detect the enhancement angle (S140).

Specifically, the control unit 60 operates the excitation light irradiation unit 20 to scan the incident angle of the excitation light α to the metal film 74 and operates the fluorescence detection unit 40 to detect the plasmon scattered light. At that time, the control unit 60 operates the position switching mechanism 47 to arrange the optical filter 43 outside the optical path of the light receiving unit 41. Then, the control unit 60 determines the incident angle of the excitation light α when the light amount of the plasmon scattered light is maximum as the enhancement angle.

Next, the control unit 60 operates the excitation light irradiation unit 20 and the fluorescence detection unit 40 to irradiate the sensor chip 70 arranged in the appropriate measurement position with the excitation light α, and record the output value of the light receiving sensor 45 (optical blank value) (S150).

At that time, the control unit 60 operates the angle adjusting mechanism 22 to set the incident angle of the excitation light α to the enhancement angle. Also, the control unit 60 operates the position switching mechanism 47 to arrange the optical filter 43 within the optical path of the light receiving unit 41.

Next, the control unit 60 operates the conveyance stage 52 to move the sensor chip 70 to the mounting/detaching position, and the user detaches the sensor chip 70 from the chip holder 54 (S160).

Then, the user introduces liquid (labeling solution) containing a secondary antibody labeled with a fluorescent substance into the well member 76 (S170). In the well member 76, the analyte captured on the metal film 74 is labeled with the fluorescent substance by an antigen-antibody reaction (secondary reaction). Thereafter, the inside of the well member 76 is washed to remove free fluorescent substances and the like.

Then, the user mounts the sensor chip 70 again on the chip holder 54 located in the mounting/detaching position (S180). The sensor chip 70 mounted on the chip holder 54 is conveyed by the conveyance unit 50 to the appropriate measurement position stored in the control unit 60 (S190).

Note that, at that time, it is also possible to configure to arrange the sensor chip 70 in the appropriate measurement position by controlling as at step S140 described above without using the information of the appropriate measurement position stored in the control unit 60.

Next, the control unit 60 operates the excitation light irradiation unit 20 and the fluorescence detection unit 40 to irradiate the sensor chip 70 arranged in the appropriate measurement position with the excitation light $\alpha$, and detect the fluorescence $\gamma$ emitted from the fluorescent substance for labeling the analyte captured by the ligand (S200). On the basis of the intensity of the detected fluorescence $\gamma$, it is possible to convert the same to the amount, concentration and the like of the analyte, if necessary.

By the above-described procedure, the presence or amount of the analyte in the sample solution may be detected.

Note that position detection and position adjustment (S130 and S140), enhancement angle detection (S150), and optical blank value measurement (S160) may also be performed before the primary reaction (S100).

When the incident angle of the excitation light $\alpha$ is determined in advance, the detection of the enhancement angle (S150) may be omitted. In this case, the position detection and position adjustment (S130 and S140) of the sensor chip 70 are performed before the optical blank value measurement (S160). In this manner, it is preferable that the position detection and position adjustment (S130 and S140) of the sensor chip 70 are performed before the optical measurement (detection of the enhancement angle, measurement of the optical blank value, and detection of the fluorescence) is performed for the first time.

Also, in the above description, after the primary reaction (S100) in which the analyte and the ligand are reacted, the secondary reaction (S180) in which the analyte is labeled with the fluorescent substance is performed (two-step system). However, timing at which the analyte is labeled with the fluorescent substance is not especially limited.

For example, before introducing the sample solution into the well member 76, the labeling solution may be added to the sample solution to label the analyte in advance with the fluorescent substance. Also, by simultaneously injecting the sample solution and the labeling solution into the well member 76, the analyte labeled with the fluorescent substance is captured by the ligand. In this case, the analyte is labeled with the fluorescent substance and the analyte is captured by the ligand.

In both cases, both the primary reaction and the secondary reaction may be completed by introducing the sample solution into the well member 76 (one-step method). When the one-step system is adopted in this manner, the enhancement angle detection (S150) is performed before the antigen-antibody reaction, and the position detection and position adjustment (S130 and S140) of the sensor chip are performed before that.

Although the preferred embodiment of the present invention is described above, the present invention is not limited thereto; for example, although the SPFS device is described in the above embodiment, the position detection method and the position detection device according to the present invention are also applicable to an optical sample detection system other than the SPFS device such as an SPR device.

Furthermore, in the above embodiment, although a case where the sample solution holding member is the well member is described, as described above, this is not especially limited as long as this is the sample solution holding member including the boundary surface so that the excitation light $\alpha$ reflected by the boundary surface is incident on the light receiving sensor 31 of the excitation light detection unit 30, and various modifications may be made without departing from an object of the present invention; for example, this may be a flow path lid in the sensor chip of a flow path chip type.

REFERENCE SIGNS LIST

10 SPFS device
20 Excitation light irradiation unit
21 Light source unit
22 Angle adjusting mechanism
23 Light source control unit
30 Excitation light detection unit
31 Light receiving sensor
32 Sensor control unit
40 Fluorescence detection unit
41 Light receiving unit
42 First lens
43 Optical filter
44 Second lens
45 Light receiving sensor
47 Position switching mechanism
48 Sensor control unit
50 Conveyance unit
52 Conveyance stage
54 Chip holder
60 Control unit
70 Sensor chip
72 Dielectric member
72a Incident surface
72b Film formation surface
72c Emission surface
74 Metal film
76 Well member
76a Boundary surface
$\alpha$ Measurement light (excitation light)
$\beta$ Reflected light
$\gamma$ Fluorescence

The invention claimed is:

1. A position detection method which detects, in an optical sample detection system which detects a sample by irradiating a sensor chip with excitation light, the sensor chip provided with:
 a dielectric member;
 a metal film adjacent to an upper surface of the dielectric member; and
 a sample solution holding member arranged on an upper surface of the metal film, at least any one of a position of the sensor chip and a relative position between the dielectric member and the sample solution holding member, the position detection method comprising steps of:

irradiating the sensor chip with measurement light while changing a distance between the sensor chip and a measurement light irradiation unit and detecting reflected light traveling in a predetermined direction out of the reflected light generated when the measurement light is reflected by the sensor chip; and detecting the relative position between the dielectric member and the sample solution holding member on the basis of a change in intensity of the detected reflected light, wherein the intensity of the detected reflected light has a peak at a well member boundary surface position.

2. The position detection method according to claim 1, wherein a position of an end of the dielectric member is specified on the basis of the reflected light generated when the measurement light is reflected by a boundary between the sample solution holding member and the dielectric member.

3. The position detection method according to claim 2, wherein a position of an average value of a minimum value of intensity of the reflected light and a maximum value of the intensity of the reflected light is made the position of the end of the dielectric member in a change in the intensity of the reflected light.

4. The position detection method according to claim 1, wherein a boundary surface position of the sample solution holding member is specified on the basis of the reflected light generated when the measurement light is reflected by a boundary surface between a bottom surface and a side surface of the sample solution holding member.

5. The position detection method according to claim 4, wherein a position in which a local maximum point in which the intensity of the reflected light temporarily increases appears is made the boundary surface position of the sample solution holding member in the change in the intensity of the reflected light.

6. The position detection method according to claim 4, wherein a position of an end of the dielectric member is specified on the basis of the reflected light generated when the measurement light is reflected by a boundary between the sample solution holding member and the dielectric member.

7. The position detection method according to claim 6, wherein a position of an average value of a minimum value of intensity of the reflected light and a maximum value of the intensity of the reflected light is made the position of the end of the dielectric member in the change in the intensity of the reflected light.

8. The position detection method according to claim 6, wherein the relative position between the sample solution holding member and the dielectric member is specified on the basis of the boundary surface position of the sample solution holding member and the position of the end of the dielectric member.

9. The position detection method according to claim 1, wherein the measurement light is a beam having a predetermined beam diameter.

10. The position detection method according to claim 9, wherein the predetermined beam diameter is smaller than an incident surface on which the excitation light is incident of the dielectric member and smaller than a distance between the boundary surface between the bottom surface and the side surface of the sample solution holding member and the boundary between the sample solution holding member and the dielectric member.

11. The position detection method according to claim 1, wherein a wavelength of the measurement light is a wavelength from a visible light region to a near infrared light region.

12. The position detection method according to claim 1, wherein the measurement light is the excitation light.

13. A position detection device which detects, in an optical sample detection system which detects a sample by irradiating a sensor chip with excitation light, the sensor chip provided with:

a dielectric member;

a metal film adjacent to an upper surface of the dielectric member; and a sample solution holding member arranged on an upper surface of the metal film, at least any one of a position of the sensor chip and a relative position between the dielectric member and the sample solution holding member, the position detection device comprising:

a measurement light irradiation unit which irradiates the sensor chip with measurement light;

a measurement light detection unit which detects reflected light traveling in a predetermined direction out of the reflected light generated when the measurement light is reflected by the sensor chip;

a conveyance unit which changes a distance between the sensor chip and the excitation light irradiation unit; and a control unit which detects the relative position between the dielectric member and the sample solution holding member on the basis of a change in intensity of the reflected light detected by the measurement light detection unit, wherein the intensity of the detected reflected light has a peak at a well member boundary surface position.

14. The position detection device according to claim 13, wherein the control unit is configured to specify a position of an end of the dielectric member on the basis of the reflected light generated when the measurement light is reflected by a boundary between the sample solution holding member and the dielectric member.

15. The position detection device according to claim 14, wherein the hardware processor to makes a position of an average value of a minimum value of the intensity of the reflected light and a maximum value of the intensity of the reflected light the position of the end of the dielectric member in the change in the intensity of the reflected light.

16. The position detection device according to claim 13, wherein the hardware processor specifies a boundary surface position of the sample solution holding member on the basis of the reflected light generated when the measurement light is reflected by a boundary surface between a bottom surface and a side surface of the sample solution holding member.

17. The position detection device according to claim 16, wherein the hardware processor makes a position in which a local maximum point in which the intensity of the reflected light temporarily increases appears the boundary surface position of the sample solution holding member in the change in the intensity of the reflected light.

18. The position detection device according to claim 16, wherein the hardware processor specifies a position of an end of the dielectric member on the basis of the reflected light generated when the measurement light is reflected by a boundary between the sample solution holding member and the dielectric member.

19. The position detection device according to claim 18, wherein the hardware processor makes a position of an average value of a minimum value of the intensity of the reflected light and a maximum value of the intensity of the reflected light the position of the end of the dielectric member in the change in the intensity of the reflected light.

20. The position detection device according to claim 13, wherein the measurement light is a beam having a predetermined beam diameter.

21. The position detection device according to claim 20, wherein the predetermined beam diameter is smaller than an incident surface on which the excitation light is incident out of the dielectric member and smaller than a distance between the boundary surface between the bottom surface and the side surface of the sample solution holding member and the boundary between the sample solution holding member and the dielectric member.

22. The position detection device according to claim 13, wherein a wavelength of the measurement light is a wavelength from a visible light region to a near infrared light region.

23. The position detection device according to claim 13, wherein the measurement light is the excitation light, and the measurement light irradiation unit is the excitation light irradiation unit.

24. The position detection device according to claim 13, wherein a light receiving sensor of the measurement light detection unit is a photodiode.

* * * * *